United States Patent
Wolfe et al.

(10) Patent No.: US 7,155,547 B2
(45) Date of Patent: Dec. 26, 2006

(54) INTEGRALLY EMBEDDED BACKPLANE DATA DEVICE AND METHOD

(75) Inventors: Sarah M. Wolfe, Scottsdale, AZ (US); Jeffrey M. Harris, Chandler, AZ (US); Malcolm J. Rush, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 259 days.

(21) Appl. No.: 10/884,417

(22) Filed: Jul. 2, 2004

(65) Prior Publication Data

US 2006/0015666 A1 Jan. 19, 2006

(51) Int. Cl.
*G06F 13/00* (2006.01)
(52) U.S. Cl. .......................................... 710/104; 710/8
(58) Field of Classification Search ...................... None
See application file for complete search history.

(56) References Cited

U.S. PATENT DOCUMENTS

| | | | | |
|---|---|---|---|---|
| 6,078,979 | A * | 6/2000 | Li et al. ...................... | 710/312 |
| 6,289,405 | B1 * | 9/2001 | Movall et al. .............. | 710/104 |
| 2003/0078997 | A1 * | 4/2003 | Franzel ....................... | 709/220 |
| 2004/0177182 | A1 * | 9/2004 | Metevier et al. ............ | 710/100 |
| 2005/0281254 | A1 * | 12/2005 | Harris et al. ................ | 370/386 |

* cited by examiner

*Primary Examiner*—Glenn A. Auve
(74) *Attorney, Agent, or Firm*—Kevin D. Wills

(57) ABSTRACT

A multi-service platform system (100) includes a monolithic backplane (104), a slot (108) coupled to the monolithic backplane, wherein the slot is coupled to receive a payload module (102), and a backplane data device (106) integrally embedded in the monolithic backplane, wherein the backplane data device comprises backplane system data (424) for communication to the payload module when the payload module is coupled to the monolithic backplane.

14 Claims, 2 Drawing Sheets

INTEGRALLY EMBEDDED BACKPLANE DATA DEVICE AND METHOD

BACKGROUND OF THE INVENTION

In prior art embedded computer systems, backplanes are passive and unintelligent entities. In some embedded computer systems there is an active and intelligent system management entity that is a companion to the backplane. The system management entity is able to provide factual information about the backplane to a payload card and is situated on a card coupled to the backplane and is not part of the backplane itself. This has the disadvantage of occupying valuable slot space in the computer system with a card to supply backplane data to other payload cards.

In current high-speed data networks, such as multi-service platform systems using VERSAmodule Eurocard (VMEbus) protocols, maximum transfer speeds are limited by the number of slots occupied by payload nodes, the distance between payload nodes, signal degradation on the parallel bus, and the like. Due to the myriad of factors affecting signal integrity on the parallel bus, it is difficult to optimize transfer speed between payload nodes for a given configuration. For example, the more slots on a backplane that are occupied by payload nodes, the more likely there will be noise and other types of signal integrity interference introduced on the parallel bus.

Accordingly, there is a significant need for an apparatus and method that overcomes the deficiencies of the prior art outlined above.

BRIEF DESCRIPTION OF THE DRAWINGS

Referring to the drawing.

Figure 1:
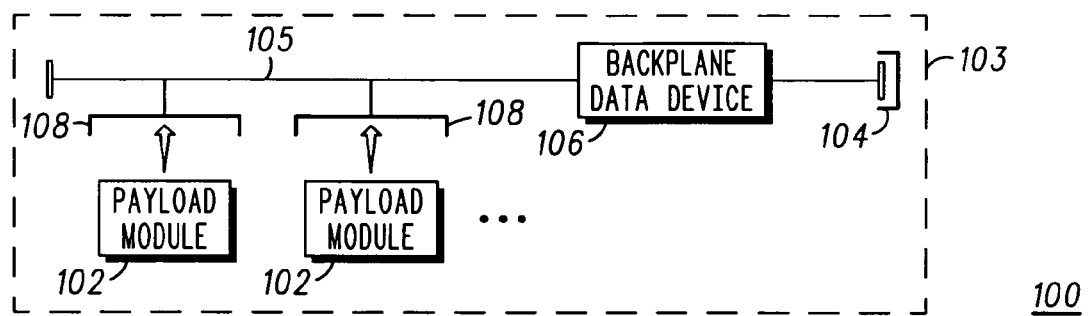
FIG. 1 depicts a multi-service platform system according to an embodiment of the invention.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

In the following detailed description of exemplary embodiments of the invention, reference is made to the accompanying drawings, which illustrate specific exemplary embodiments in which the invention may be practiced. These embodiments are described in sufficient detail to enable those skilled in the art to practice the invention, but other embodiments may be utilized and logical, mechanical, electrical and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

For clarity of explanation, the embodiments of the present invention are presented, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of one embodiment.

FIG. 1 depicts a multi-service platform system 100 according to one embodiment of the invention. Multi-service platform system 100 can include an embedded-type computer chassis (as opposed to an enterprise based chassis), with software and any number of slots for inserting modules. Modules can add functionality to multi-service platform system 100 through the addition of processors, memory, storage devices, and the like. Monolithic backplane 104 is used for connecting modules placed in the slots 108.

In the embodiment depicted in FIG. 1, multi-service platform system 100 includes a single multi-service platform chassis 103 with software and any number of slots 108 for inserting payload modules 102. In an embodiment, multi-service platform system 100 can include a multi-service platform system chassis 103 having 21 slots. Multi-service platform systems with other than 21 slots are within the scope of the invention.

In one embodiment, multi-service platform system 100 includes a single chassis 103 having a monolithic backplane 104 that can include a parallel bus 105 for communicatively coupling payload modules 102. In this embodiment, monolithic backplane 104 includes a single backplane in a single multi-service platform system chassis 103 designed for communicating via parallel bus 105. In an example of an embodiment, parallel bus 105 can be VERSAmodule Eurocard (VMEbus) where payload modules 102 communicate using VMEbus protocols. As an example of an embodiment, a multi-service platform system 100 can include model MVME5100 manufactured by Motorola Computer Group, 2900 South Diablo Way, Tempe, Ariz. 85282. The invention is not limited to this model or manufacturer and any multi-service platform system is included within the scope of the invention.

In another embodiment, monolithic backplane 104 can include a number of bus segments, where each bus segment operates under its own protocol. For example, monolithic backplane 104 can be divided into two bus segments, where each bus segment operates using a separate parallel bus protocol. Each bus segment can have any number of slots dedicated to that particular bus segment. In this embodiment, each bus segment and the payload modules attached to each bus segment through the dedicated slots are separate and independent from the other bus segment and payload modules coupled to the other bus segment. In an embodiment, each bus segment can operate using a separate operating speed (i.e. clock speed). The invention is not limited to two bus segments and any number of bus segments is within the scope of the invention.

Multi-service platform system 100 can include any number of payload modules 102 coupled to monolithic backplane 104 operating using parallel bus 105. Monolithic backplane 104 can include hardware and software necessary to implement a data network using a parallel multi-drop topology. An example of a parallel multi-drop topology is the VMEbus topology using any of the VMEbus protocols known in the art. VMEbus is defined in the ANSI/VITA 1-1994 and ANSI/VITA 1.1-1997 standards, promulgated by the VMEbus International Trade Association (VITA), P.O. Box 19658, Fountain Hills, Ariz., 85269 (where ANSI stands for American National Standards Institute).

A parallel multi-drop protocol can be for example, a Peripheral Component Interconnect (PCI) based protocol. In an embodiment of the invention, PCI based protocols can include both PCI and PCI-X protocols. Examples of variants of PCI protocols, without limitation, include 133 MHz 64-bit PCI-X, 100 MHz 64-bit PCI-X down to 66 MHz 32-bit PCI-X, and the like. Variants of older PCI based protocols can include, for example and without limitation, 66 MHz 64-bit PCI down to 33 MHz 32-bit PCI, and the like.

In another embodiment of the invention, VMEbus based protocols can include, but are not limited to, Single Cycle Transfer protocol (SCT), Block Transfer protocol (BLT), Multiplexed Block Transfer protocol (MBLT), Two Edge VMEbus protocol (2eVME) and Two Edge Source Synchronous Transfer protocol (2eSST). These VMEbus protocols are known in the art.

In an embodiment of the invention, monolithic backplane 104 and payload module 102 have a set of interlocking connectors designed to interlock with each other when payload module 102 is placed in a slot 108 of multi-service platform system 100. Mechanical and electrical specifications for a portion of these interlocking connectors can be found in the ANSI/VITA 1-1994 and ANSI/VITA 1.1-1997 and the VITA 41 standards cited above for VMEbus systems. For example, these standards define P0 mechanical envelope, P1 mechanical envelope, and P2 mechanical envelope on payload module 102. These standards further define corresponding J0 mechanical envelope, J1 mechanical envelope, and J2 mechanical envelope on monolithic backplane 104. Connectors in the P0/J0, P1/J1 and P2/J2 mechanical envelopes can interlock when payload module 102 is placed in a slot of multi-service platform system 100. Each of the connectors in these mechanical envelopes can have a number of rows of pins. For example, connectors in the P1/J1 and P2/J2 mechanical envelopes can have 3 rows, 5 rows or 7 rows of pins depending on the application.

In another embodiment, monolithic backplane 104 and parallel bus 105 can operate using CompactPCI® protocol. CompactPCI protocol, including mechanical dimensions, electrical specifications, and the like, are known in the art and set forth in the CompactPCI Specification, by PCI Industrial Computer Manufacturers Group (PCIMG™), 301 Edgewater Place, Suite 220, Wakefield, Mass.

In an embodiment, monolithic backplane 104 includes a backplane data device 106 which is integrally embedded in monolithic backplane 104. Backplane data device 106 is an integral part of monolithic backplane 104 and not part of a payload module coupled to the monolithic backplane 104. Backplane data device 106 is embedded in monolithic backplane 104 in that backplane data device 106 cannot be removed or serviced by a user of multi-service platform system chassis 103 and that substantially all slots in monolithic backplane 104 are coupled to backplane data device 106. In this manner, each payload module 102 coupled to monolithic backplane 104 can be communicatively coupled to backplane data device 106.

In an embodiment, backplane data device 106 is a passive device comprising backplane system data. In this embodiment, backplane data device is not active and does not control or configure modules in multi-service platform system 100. In an embodiment, backplane data device 106 includes backplane system data for communication to payload module 102, when payload module 102 is coupled to monolithic backplane 104. In one embodiment, backplane data device 106 can be an entity on parallel bus 105, similar to a payload module 102. In another embodiment, backplane data device 106 can be associated with an Intelligent Platform Management Interface (IPMI) engine and be coupled to payload modules 102 via serial clock and serial data lines, where serial clock and serial data lines are known in the art of parallel buses.

In an embodiment, backplane data device 106 can provide Vital Product Data (VPD) about monolithic backplane 104, multi-service platform system chassis 103 and other data that may affect the operation of payload module 102. For example, backplane data device 106 can be pre-programmed with backplane system data such as the type of connectors in the P0/J0, P1/J1, P2/J1 mechanical envelopes for each slot 108, the number of bus segments present in multi-service platform system 100, the number of slots 108 present in each bus segment, the operating speed (i.e. clock speed) a payload module may operate in each bus segment, the backplane type including type of network available and the protocols used, the number and type of cooling fans present, and the like. Backplane data device 106 is not limited to supplying the above elements, and any backplane system data pertinent to multi-service platform system 100 is included within the scope of the invention.

In an embodiment, when payload module 102 is coupled to multi-service platform system 100, payload module 102 can discover backplane data device 106 on monolithic backplane 104. Payload module 102 can read backplane system data from backplane data device 106. From backplane system data, payload module 102 can determine if payload module 102 is operable in multi-service platform system 100. For example, backplane data device 106 can comprise backplane system data that indicates that monolithic backplane operates using VMEbus protocols. If payload module 102 is not configured to operating using those VMEbus protocols, payload module 102 is not operable in multi-service platform system. If it is determined that payload module 102 is operable in multi-service platform system 100, then payload module 102 can configure itself based on backplane system data provided by backplane data device 106. For example, maximum operating speed of payload module on parallel bus 105 can be provided in backplane system data. As such, payload module 102 can be configured to operate at that maximum operating speed, and the like.

Figure 2:
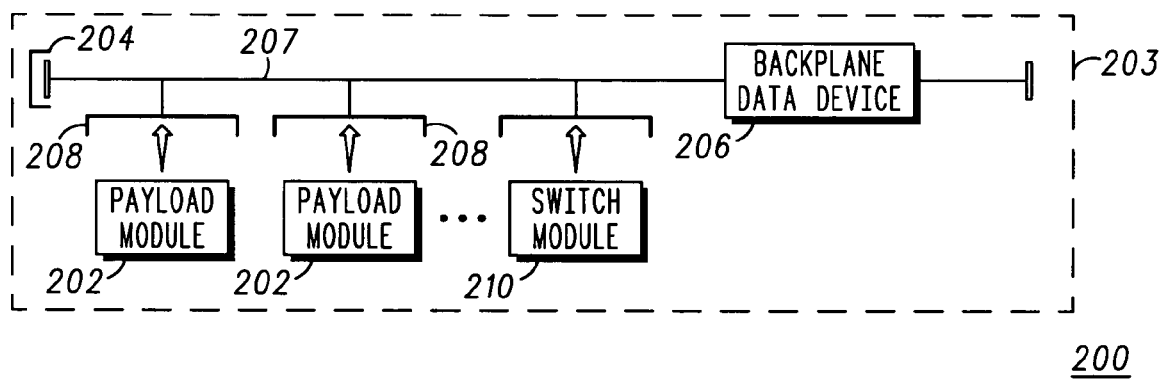
FIG. 2 depicts a multi-service platform system according to another embodiment of the invention.

FIG. 2 depicts a multi-service platform system 200 according to another embodiment of the invention. Multi-service platform system 200 can include an embedded-type computer chassis, with software and any number of slots for inserting modules. Modules can add functionality to multi-service platform system 200 through the addition of processors, memory, storage devices, and the like. Monolithic backplane 204 is used for connecting modules placed in the slots 208.

In the embodiment depicted in FIG. 2, multi-service platform system 200 includes a single multi-service platform chassis 203 with software and any number of slots 208 for inserting payload modules 202. In an embodiment, multi-service platform system 200 can include a multi-service platform system chassis 203 having 21 slots. Multi-service platform systems with other than 21 slots are within the scope of the invention.

In this embodiment, monolithic backplane 204 can include switched fabric 207. Switched fabric 207 operating on monolithic backplane 204 can use a switch module 210 as a central switching hub with any number of payload modules 202 coupled to switch module 210. Although FIG. 2 depicts switched fabric 207 as a bus for diagrammatic ease, switched fabric 207 may in fact be a star topology, mesh topology, and the like as known in the art for communicatively coupling switched fabrics. Switched fabric 207 can be based on a point-to-point, switched input/output (I/O) fabric, whereby cascaded switch devices interconnect end node devices. Switched fabric 207 communicatively couples payload modules in multi-service platform system 200. Switched fabric 207 on monolithic backplane 204 can be implemented by using one or more of a plurality of switched fabric standards, for example and without limitation, Infini-Band™, Serial RapidIO™, FibreChannel™, Ethernet™, PCI Express™, Universal Serial Bus (USB), Serial Advanced Technology Architecture (Serial ATA), Serial Attached Small Computer System Interface (Serial Attached SCSI), and the like. Switched fabric 207 on monolithic backplane 204 is not limited to the use of these switched fabric standards and the use of any switched fabric standard is within the scope of the invention.

In another embodiment, monolithic backplane 204 can include a number of fabric segments, where each fabric segment operates under its own protocol. For example, monolithic backplane 204 can be divided into two fabric segments, where each fabric segment operates using a separate switched fabric standard. Each fabric segment can have any number of slots dedicated to that particular fabric segment. In this embodiment, each fabric segment and the payload modules attached to each fabric segment through the dedicated slots are separate and independent from the other fabric segment and payload modules coupled to the other fabric segment. In an embodiment, each fabric segment can operate using a separate operating speed (i.e. clock speed). The invention is not limited to two fabric segments and any number of fabric segments is within the scope of the invention.

In an embodiment, monolithic backplane 204 can use the CompactPCI Serial Mesh Backplane (CSMB) topology standard as set forth in PCI Industrial Computer Manufacturers Group (PCIMG®) specification 2.20, promulgated by PCIMG, 301 Edgewater Place, Suite 220, Wakefield, Mass. CSMB provides infrastructure for applications such as Ethernet, Serial RapidIO, Ethernet, other proprietary or consortium based transport protocols, and the like.

In yet another embodiment, monolithic backplane 204 can use Advanced Telecommunications Computer Architecture (AdvancedTCA™) topology. AdvancedTCA form factor, including mechanical dimensions, electrical specifications, and the like, are known in the art and set forth in the AdvancedTCA Specification, by PCI Industrial Computer Manufacturers Group (PCIMG), 301 Edgewater Place, Suite 220, Wakefield, Mass.

In an embodiment, monolithic backplane 204 includes a backplane data device 206 which is integrally embedded in monolithic backplane 204. Backplane data device 206 is an integral part of monolithic backplane 204 and not part of a payload module or switch module coupled to the monolithic backplane 204. Backplane data device 206 is embedded in monolithic backplane 204 in that backplane data device 206 cannot be removed or serviced by a user of multi-service platform system chassis 203 and that substantially all slots in monolithic backplane 204 are coupled to backplane data device 206. In this manner, each payload module 202 coupled to monolithic backplane 204 can be communicatively coupled to backplane data device 206.

In an embodiment, backplane data device 206 is a passive device comprising backplane system data. In this embodiment, backplane data device is not active and does not control or configure modules in multi-service platform system 200. In an embodiment, backplane data device 206 includes backplane system data for communication to payload module 202, when payload module 202 is coupled to monolithic backplane 204. In one embodiment, backplane data device 206 can be an entity on switched fabric 207, similar to a payload module 202. In another embodiment, backplane data device 206 can be passive and not be an element on switched fabric 207.

In an embodiment, backplane data device 206 can provide Vital Product Data about monolithic backplane 204, multi-service platform system chassis 203 and other data that may affect the operation of payload module 202. For example, backplane data device 206 can be pre-programmed with backplane system data such as the type of connectors available for each slot 208, the number of bus segments present in multi-service platform system 200, the number of slots 208 present in each bus segment, the operating speed (i.e. clock speed) a payload module may operate in each bus segment, the backplane type including type of network available and the protocols used, the number and type of cooling fans present, and the like. Backplane data device 206 is not limited to supplying the above elements, and any backplane system data pertinent to multi-service platform system 200 is included within the scope of the invention.

In an embodiment, backplane data device 206 can be an entity on switched fabric 207, similar to payload module 202. In another embodiment, backplane data device 206 can be associated with an Intelligent Platform Management Interface (IPMI) engine and be coupled to payload modules 202 via serial data lines, where serial data lines are known in the art of system management.

Figure 3:
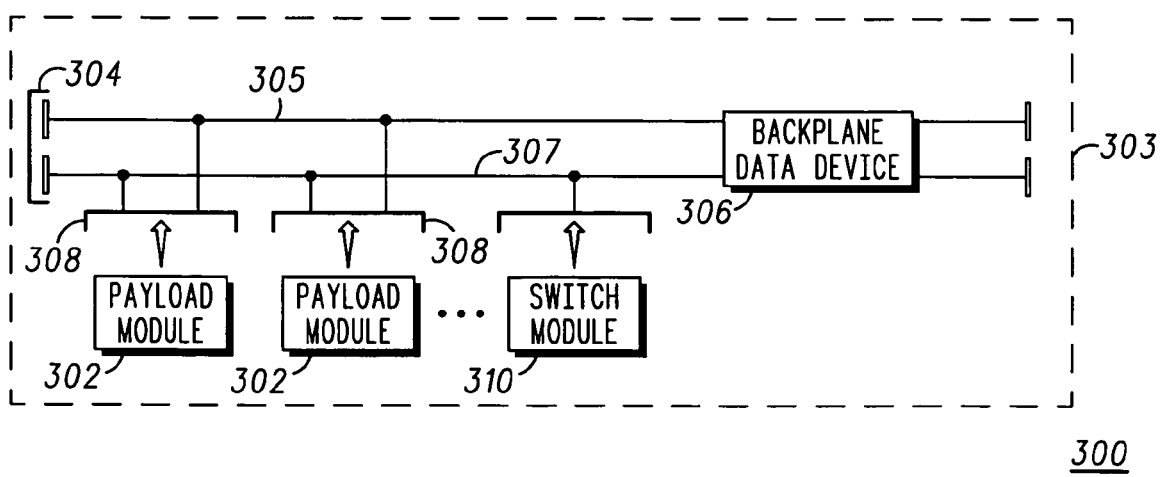
FIG. 3 depicts a multi-service platform system according to yet another embodiment of the invention.

FIG. 3 depicts a multi-service platform system 300 according to yet another embodiment of the invention. Multi-service platform system 300 can include an embedded-type computer chassis, with software and any number of slots for inserting modules. Modules can add functionality to multi-service platform system 300 through the addition of processors, memory, storage devices, and the like. Monolithic backplane 304 is used for connecting modules placed in the slots 308.

In the embodiment depicted in FIG. 3, multi-service platform system 300 includes a single multi-service platform chassis 303 with software and any number of slots 308 for inserting payload modules 302. In an embodiment, multi-service platform system 300 can include a multi-service platform system chassis 303 having 21 slots. Multi-service platform systems with other than 21 slots are within the scope of the invention.

In an embodiment, monolithic backplane 304 can include a backplane topology conforming to the VMEbus switched serial standard (VXS) as set forth in VITA 41 promulgated by VMEbus International Trade Association (VITA), P.O. Box 19658, Fountain Hills, Ariz., 85269. VXS includes a switched fabric 307, on a monolithic backplane 304 coincident with a parallel bus 305. Monolithic backplane 304 is defined to include a switched fabric 307 coincident with parallel bus 305. In other words, monolithic backplane 304 includes both switched fabric 307 and parallel bus 305 in the same physical backplane structure such that payload module 302 coupled to monolithic backplane 304 can communicate using one or both of switched fabric 307 and parallel bus 305. Parallel bus protocols and switched fabric protocols discussed above, including switch module 310 apply to the embodiment depicted in FIG. 3. Although FIG. 3 depicts switched fabric 307 as a bus for diagrammatic ease, switched fabric 307 may in fact be a star topology, mesh topology, and the like as known in the art for communicatively coupling switched fabrics.

In another embodiment, monolithic backplane 304 can include a number of fabric segments, where each fabric segment operates under its own protocol. For example, monolithic backplane 304 can be divided into two fabric segments, where each fabric segment operates using a separate switched fabric standard or parallel bus protocol. Each fabric segment can have any number of slots dedicated to that particular fabric segment. In this embodiment, each fabric segment and the payload modules attached to each fabric segment through the dedicated slots are separate and independent from the other fabric segment and payload modules coupled to the other fabric segment. In an embodiment, each fabric segment can operate using a separate operating speed (i.e. clock speed). The invention is not limited to two fabric segments and any number of fabric segments is within the scope of the invention.

In an embodiment, monolithic backplane 304 includes a backplane data device 306 which is integrally embedded in monolithic backplane 304. Backplane data device 306 is an integral part of monolithic backplane 304 and not part of a payload module or switch module coupled to the monolithic backplane 304. Backplane data device 306 is embedded in monolithic backplane 304 in that backplane data device 306 cannot be removed or serviced by a user of multi-service platform system chassis 303 and that substantially all slots in monolithic backplane 304 are coupled to backplane data device 306. In this manner, each payload module 302 coupled to monolithic backplane 304 is communicatively coupled to backplane data device 306. In an embodiment, backplane data device 306 can be coupled to at least one of parallel bus 305 and switched fabric 307. In another embodiment, backplane data device 306 can be associated with an IPMI engine and coupled to payload module 302 via serial data lines, where serial data lines are known in the art of system management.

In an embodiment, backplane data device 306 is a passive device comprising backplane system data. In this embodiment, backplane data device is not active and does not control or configure modules in multi-service platform system 300. In an embodiment, backplane data device 306 includes backplane system data for communication to payload module 302, when payload module 302 is coupled to monolithic backplane 304. In one embodiment, backplane data device 306 can be an entity on switched fabric 307, similar to a payload module 302. In another embodiment, backplane data device 306 can be passive and not be an element on switched fabric 307.

In an embodiment, backplane data device 306 can provide Vital Product Data about monolithic backplane 304, multi-service platform system chassis 303 and other data that may affect the operation of payload module 302. For example, backplane data device 306 can be pre-programmed with backplane system data such as the type of connectors available for each slot 308, the number of bus segments present in multi-service platform system 300, the number of slots 308 present in each bus segment, the operating speed (i.e. clock speed) a payload module may operate in each bus segment, the backplane type including type of network available and the protocols used, the number and type of cooling fans present, and the like. Backplane data device 306 is not limited to supplying the above elements, and any backplane system data pertinent to multi-service platform system 300 is included within the scope of the invention.

Figure 4:
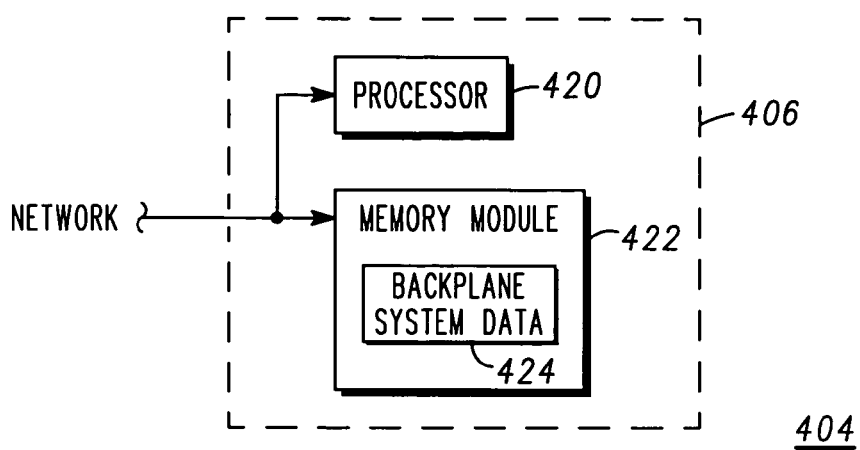
FIG. 4 depicts a monolithic backplane illustrating an embodiment of the invention.

FIG. 4 depicts a monolithic backplane 404 illustrating an embodiment of the invention. Monolithic backplane 404 can include backplane data device 406 as described above. In an embodiment, backplane data device 406 can include a processor 420 for processing algorithms stored in memory module 422. Memory module can comprise backplane system data 424, and can include, but is not limited to, random access memory (RAM), read only memory (ROM), flash memory, electrically erasable programmable ROM (EEPROM), and the like. Memory module 422 can contain stored instructions, tables, data, and the like, to be utilized by processor 420.

In an embodiment, backplane system data 424 can include data such as the type of connectors available for each slot, the number of bus segments present in multi-service platform system, the number of slots present in each bus segment, the operating speed (i.e. clock speed) a payload module may operate in each bus segment, the backplane type including type of network available and the protocols used, the number and type of cooling fans present, and the like. Backplane system data 424 is not limited to the data listed and any other data that can affect the operation of a payload module, switch module, and the like, can be included and be within the scope of the invention.

Backplane data device 406 can be coupled to parallel bus and/or switched fabric depending on the embodiment of multi-service platform system. In an embodiment with a parallel bus, memory module 422 and processor 420 can be coupled to monolithic backplane 404 via serial data and serial clock lines as described above. In an embodiment with a switched fabric, memory module 422 and processor 420 can be coupled to monolithic backplane via switched fabric as described above.

Figure 5:
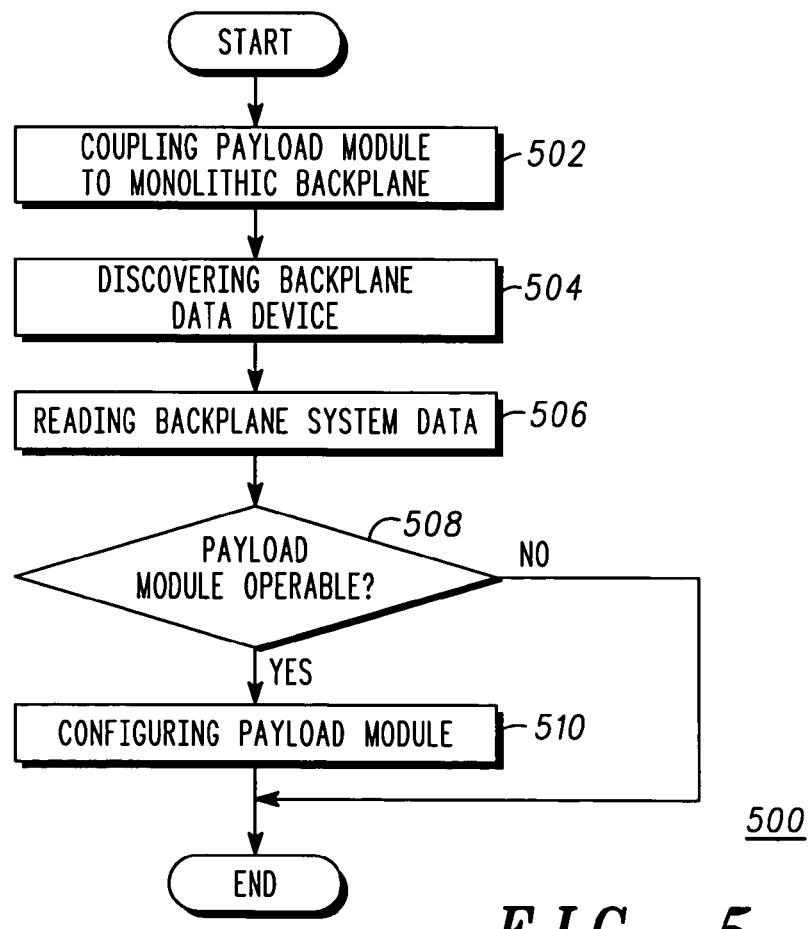
FIG. 5 illustrates a flow diagram of a method of the invention according to an embodiment of the invention.

FIG. 5 illustrates a flow diagram 500 of a method of the invention according to an embodiment of the invention. A multi-service platform system includes a backplane data device integrally embedded in monolithic backplane, where backplane data device comprises backplane system data of multi-service platform system. In step 502, payload module is coupled to monolithic backplane through a slot of multi-service platform system chassis. In step 504, payload module discovers backplane data device embedded in monolithic backplane. In step 506, payload module reads backplane system data from backplane data device.

In step 508 it is determined if payload module is operable in multi-service platform system based on backplane system data. For example, it is determined if payload module is configured to operate using the network types and protocols of multi-service platform system, if payload module can operate at the operating speed given by backplane system data, if payload module can operate given the cooling fan capacity available in multi-service platform system, and the like. If payload module is operable in multi-service platform system in step 508, then payload module is configured to operate based on backplane system data. For example, payload module can configure itself to operate at no faster than the maximum operating speed given in backplane system data, using a given network protocol, and the like. If it is determined that payload module is not operable in multi-service platform system in step 508, payload module will not be able to communicate with other payload modules in multi-service platform system. In an embodiment, a notification of whether payload module is operable in multi-service platform system can be transmitted to notify a system administrator, and the like.

While we have shown and described specific embodiments of the present invention, further modifications and improvements will occur to those skilled in the art. It is therefore, to be understood that appended claims are intended to cover all such modifications and changes as fall within the true spirit and scope of the invention.

The invention claimed is:

1. A multi-service platform system, comprising:
a monolithic backplane;
a parallel bus and a switched fabric coincident on the monolithic backplane;
a slot coupled to the monolithic backplane, wherein the slot is coupled to receive a payload module; and
a backplane data device integrally embedded in the monolithic backplane, wherein the backplane data device comprises backplane system data for communication to the payload module when the payload module is coupled to the monolithic backplane.

2. The multi-service platform system of claim 1, wherein the backplane data device comprises a memory module, and wherein the backplane system data is stored on the memory module.

3. The multi-service platform system of claim 1, wherein the payload module determines if the payload module is operable in the multi-service platform system based on the backplane system data.

4. The multi-service platform system of claim 1, wherein the backplane data device provides an operating speed to the payload module.

5. A multi-service platform system chassis, comprising:
a monolithic backplane;
a parallel bus and a switched fabric coincident on the monolithic backplane;
a slot coupled to the monolithic backplane, wherein the slot is coupled to receive a payload module; and
a backplane data device integrally embedded in the monolithic backplane, wherein the backplane data device comprises backplane system data for communication to the payload module when the payload module is coupled to the monolithic backplane.

6. The multi-service platform system chassis of claim 5, wherein the backplane data device comprises a memory module, and wherein the backplane system data is stored on the memory module.

7. The multi-service platform system of claim 5, wherein the payload module determines if the payload module is operable in the multi-service platform system based on the backplane system data.

8. The multi-service platform system chassis of claim 5, wherein the backplane data device provides an operating speed to the payload module.

9. A method, comprising:
providing a backplane data device integrally embedded in a monolithic backplane of a multi-service platform system chassis, wherein a parallel bus and a switched fabric are coincident on the monolithic backplane, and wherein the backplane data device comprises backplane system data of the multi-service platform system chassis;
coupling a payload module to the monolithic backplane through a slot of the multi-service platform system chassis;
the payload module discovering the backplane data device;
the payload module reading the backplane system data; and
the payload module determining if the payload module is operable in the multi-service platform system chassis based on the backplane system data.

10. The method of claim 9, further comprising the backplane data device providing an operating speed to the payload module.

11. The method of claim 9, further comprising configuring the payload module based on backplane system data.

12. A computer-readable medium containing computer instructions for instructing a processor to perform a method of configuring a payload module in a multi-service platform system, the instructions comprising:
providing a backplane data device integrally embedded in a monolithic backplane of a multi-service platform system chassis, wherein a parallel bus and a switched fabric are coincident on the monolithic backplane, and wherein the backplane data device comprises backplane system data of the multi-service platform system chassis;
coupling a payload module to the monolithic backplane through a slot of the multi-service platform system chassis;
the payload module discovering the backplane data device;
the payload module reading the backplane system data; and
the payload module determining if the payload module is operable in the multi-service platform system chassis based on the backplane system data.

13. The computer-readable medium of claim 12, further comprising the backplane data device providing an operating speed to the payload module.

14. The computer-readable medium of claim 12, further comprising configuring the payload module based on backplane system data.

* * * * *